(12) United States Patent
Chen (10) Patent No.: US 11,807,057 B2
(45) Date of Patent: Nov. 7, 2023

(54) TRAILER JACK DEVICE WITH A MORE EFFICIENT GEAR REDUCTION RATIO FOR IMPROVING A POWER DRILL EFFICIENCY

(71) Applicant: Ted Hsutse Chen, Industry, CA (US)

(72) Inventor: Ted Hsutse Chen, Industry, CA (US)

( * ) Notice: Subject to any disclaimer, the term of this patent is extended or adjusted under 35 U.S.C. 154(b) by 887 days.

(21) Appl. No.: 16/589,357

(22) Filed: Oct. 1, 2019

(65) Prior Publication Data

US 2021/0094372 A1   Apr. 1, 2021

(51) Int. Cl.
*B60D 1/66* (2006.01)
*B60S 9/02* (2006.01)
*B60D 1/24* (2006.01)

(52) U.S. Cl.
CPC .............. *B60D 1/66* (2013.01); *B60D 1/246* (2013.01); *B60S 9/02* (2013.01)

(58) Field of Classification Search
CPC ... B60D 1/66; B60D 1/246; B60S 9/20; F16F 37/082; F16F 2057/02073
USPC ............... 254/420; 280/186, 400, 406.1
See application file for complete search history.

(56) References Cited

U.S. PATENT DOCUMENTS

| | | | | |
|---|---|---|---|---|
| 3,187,600 A | * | 6/1965 | Seybold | F16H 55/084 74/435 |
| 4,749,169 A | * | 6/1988 | Pickles | B66F 3/12 254/DIG. 4 |
| 4,875,820 A | * | 10/1989 | Lepp | B65G 33/32 198/615 |
| 7,537,541 B2 | * | 5/2009 | Owan | F16H 1/46 475/335 |
| 10,457,254 B2 | | 10/2019 | Van Den Bos | |
| 2012/0037862 A1 | * | 2/2012 | McCarthy | B60P 3/32 254/1 |

* cited by examiner

*Primary Examiner* — Minnah L Seoh
*Assistant Examiner* — Felicia L. Brittman (57) ABSTRACT

A trailer jack device is provided. The device may include: a gearbox for actuating a trailer; and a mount connected to the gearbox via a tube. The mount may be configured to couple the trailer to the gearbox. Further, the gearbox may have a gear reduction ratio for a power drill to perform at peak efficiency while minimizing motor burnout.

8 Claims, 9 Drawing Sheets

TRAILER JACK DEVICE WITH A MORE EFFICIENT GEAR REDUCTION RATIO FOR IMPROVING A POWER DRILL EFFICIENCY

CROSS-REFERENCES TO RELATED APPLICATIONS

N/A.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

FIELD OF THE TECHNOLOGY

The present disclosure generally relates to the field of tongue jack convertible for operation by a manually operated crank or an external actuator and, more specifically, to an apparatus and a system for operating a tongue jack for a trailer with a more efficient gear reduction ratio.

DESCRIPTION OF THE RELATED ART

In general, a trailer may use a tongue jack to support the tongue of the trailer to a tow vehicle and to lower and to raise the tongue of the trailer to facilitate hitching and unhitching of the trailer to and from the tow vehicle. Currently, tongue jacks are implemented in both manually operated and power-operated forms. Manually operated tongue jacks are generally low in weight, cost, and complexity, but typically require considerable effort to operate. On the other hand, power-operated tongue jacks are generally easy to operate, but typically are heavy, costly, and require a power source for operation.

One example of this power source is the tow vehicle's electrical power system. In some implementations, this power system may provide power to the tongue jack through the trailer's brake system and the trailer's lighting system electrical harness.

Other power source examples may include a trailer-mounted battery. Although the tow vehicle's electrical system may be a lower cost alternative than a trailer-mounted battery, reliance on the tow vehicle's electrical system to power the tongue jack requires that the tow vehicle be present and that its electrical system be coupled to the trailer. This configuration may not always be technically feasible or practical. Further, the trailer-mounted battery option may be more convenient in some aspects, but a battery adds additional cost, weight, maintenance, and occupies space on the trailer. These conventional technological options result in performance inefficiencies that lack sufficient power to drive performance and may render a power-operated jack inoperable. However, none of these technologies allows for gear ratios changes to improve operation efficiency of a power drill used in connection with a trailer tongue jack with a more efficient gear reduction ratio.

Therefore, what is needed is a trailer jack device with a more efficient gear reduction ratio for improving the operation efficiency of a power drill.

SUMMARY

In an embodiment, a trailer jack device is provided. The device may include: a gearbox for actuating a trailer; and a mount connected to the gearbox via a tube, wherein the mount is configured to couple the trailer to the gearbox and the gearbox has a gear reduction ratio for a power drill to perform at peak efficiency and to minimize motor burnout.

In yet another embodiment, a trailer jack apparatus is provided. The apparatus may include: a gearbox for actuating a trailer; and a mount connected to the gearbox via a tube, wherein the mount is configured to couple the trailer to the gearbox and the gearbox has a gear reduction ratio for a power drill to perform at peak efficiency while minimizing motor burnout.

In still another embodiment, a trailer jack system is provided. The system may include: a gearbox for actuating a trailer; and a mount connected to the gearbox via a tube, wherein the mount is configured to couple the trailer to the gearbox and the gearbox has a gear reduction ratio for a power drill to perform at peak efficiency and to minimize motor burnout.

BRIEF DESCRIPTION OF THE DRAWINGS

The present invention is described in detail below with reference to the attached drawing figures, which are incorporated by reference herein and wherein:

FIG. 3D is the bevel gear inside the gearbox in accordance with an exemplary embodiment of the invention;

DETAILED DESCRIPTIONS

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent application, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application (other than the language of the claims). To the extent that any term recited in the claims at the end of this patent application is referred to in this patent application in a manner consistent with a single meaning, that is done for sake of clarity only so as to not confuse the reader, and it is not intended that such claim term by limited, by implication or otherwise, to that single meaning Finally, unless a claim element is defined by reciting the word "means" and a function without the recital of any structure, it is not intended that the scope of any claim element be interpreted based on the application of 35 U.S.C. § 112, sixth paragraph.

Figure 1:
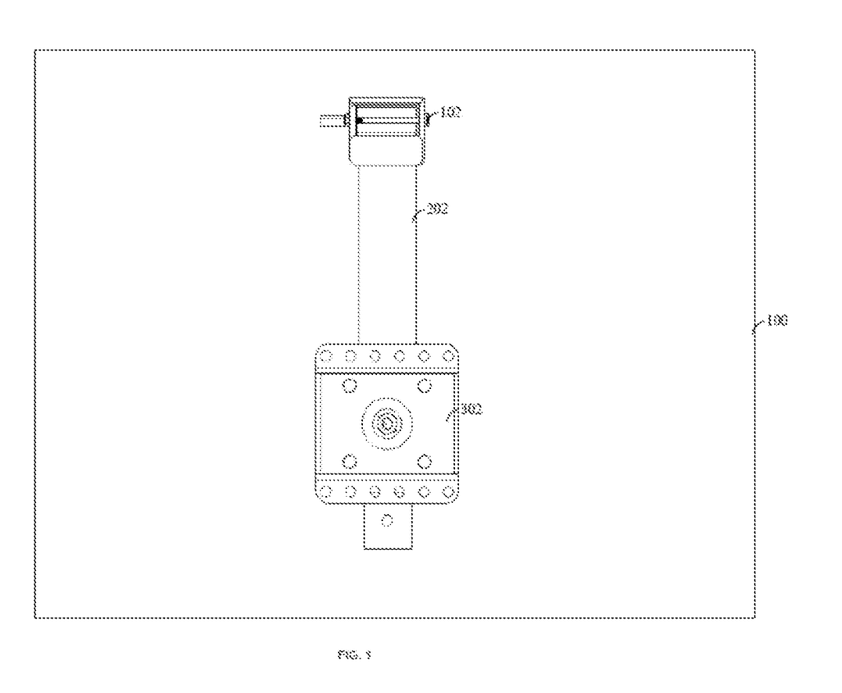
FIG. 1 is the trailer tongue jack system in accordance with an exemplary embodiment of the invention.

FIG. 1 illustrates a trailer tongue jack system 100 in accordance with an exemplary embodiment of the invention. As shown in FIG. 1, the trailer tongue jack system 100 may be configured to, adapted to, or designed to operate in connection with a conventional trailer (not shown). In some implementations, the trailer tongue jack system 100 may include a gearbox 102, a tube 202, and a mount 302.

Figure 2:
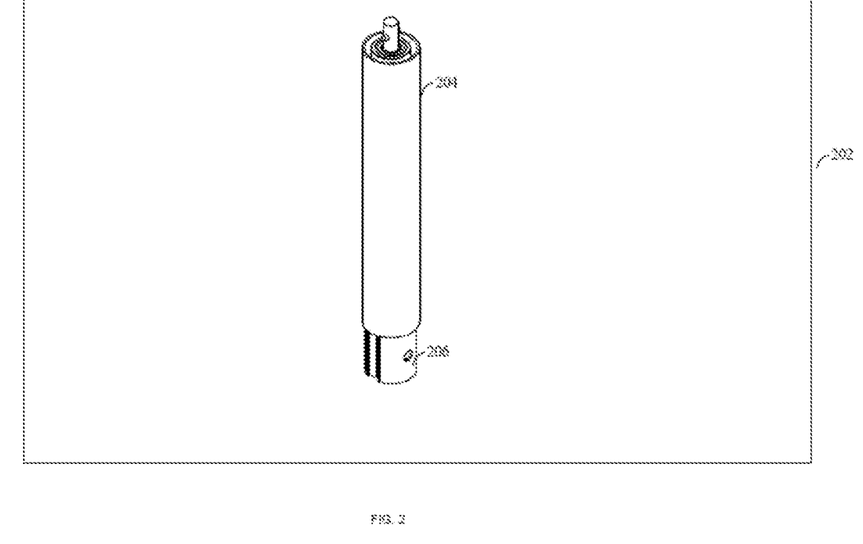
FIG. 2 is the tube of the trailer tongue jack system in accordance with another exemplary embodiment of the invention.

FIG. 2 illustrates the tube 202 in accordance with an exemplary embodiment of the invention. As shown in FIG. 2, the tube 202 may include an outer tube 204 and an inner tube 206. In some implementations, the outer tube may be configured to, adapted to, or designed to, act as an outer housing for trailer tongue jack system 100. The outer tube 204 may be configured to moves up and down along the inner tube 206. In some embodiments, the tube 202 may be implemented as a round tube or a square tube. In some implementations, the tube 202 may have a material composition mixture of at least 98% steel, at least 98% stainless steel, and/or at least 98% aluminum. This material composition mixture is optimal to allow for durability and heat reduction when turning at an increased speed. In alternate embodiments, a material composition in the range from 0% to 100% of any other materials including steel, nickel, zinc, stainless steel, or aluminum, or any material known to those skilled in the art may be used to achieve the optimal or required weight capacity. Additionally, the tube 202 may have a material composition coating mixture of at least 40% zinc, at least 50% nickel plating, and/or at least one layer of a powder coating. This material composition coating mixture is optimal to allow for rust protection. In some implementations, the tube 202 may have at least two surface coatings. In one surface coating, a materials surface coating of zinc and/or nickel may be applied to the tube 202. In another surface coating, a powder coating may be applied. This material surface coating and/or powder coating is optimal to allow for weather resistance to maintain longer performance of the tube 202.

Figure 3:
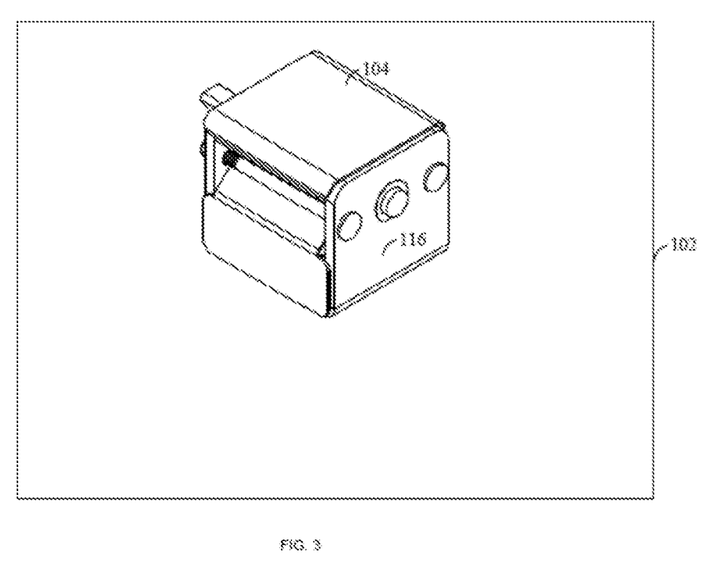
FIG. 3 is the gearbox of the trailer tongue jack system in accordance with an exemplary embodiment of the invention.

FIG. 3 illustrates the gearbox 102 in accordance with another exemplary embodiment of the invention. As shown in FIG. 3, the gearbox 102 may include a gearbox cover 104, and a gearbox housing 116. In some embodiments, the gearbox 102 may include a gearbox cover 104, a bevel pinion gear 106, a pinion gear shaft 108, a pinion gear 110, a pinion driver 112, a bevel gear 114, and a gearbox housing 116. In various embodiments, the gearbox 102 may include one or more components, subcomponents, parts, etc. that include washers, bushings, screws, locknuts, spacers, etc. In alternate embodiments, some of these components, subcomponents, and parts may include left or right portions.

Figure 3A:
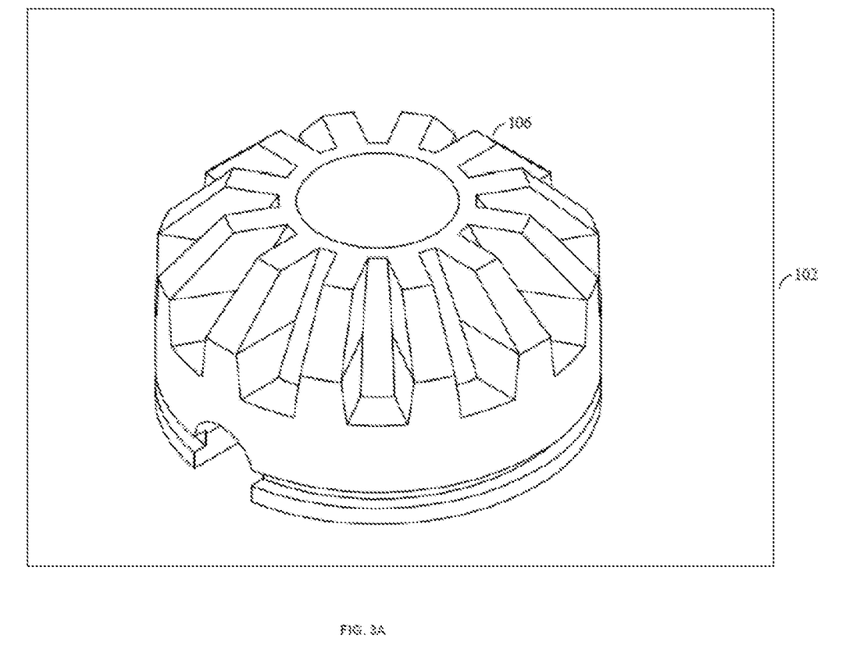
FIG. 3A is the bevel pinion gear inside the gearbox in accordance with an exemplary embodiment of the invention.

FIG. 3A illustrates the bevel pinion gear 106 inside the gearbox 102 in accordance with another exemplary embodiment of the invention. In another embodiment, the bevel pinion gear 106 may be configured to, adapted to, or designed to act as the initial contact to ignite the movement of one or more gears. In some embodiments, the bevel pinion gear 106 may be a 12 teeth pinion gear. The bevel pinion gear 106 may sit vertically along the pinion gear shaft 108, and the teeth of the bevel pinion gear 106 may intersect at a 90-degree angle to the bevel pinion gear 106. In some implementations, the bevel pinion gear 106 may have a material composition mixture of 8%-12% copper, and/or 88%-91% iron. This material composition mixture is optimal to allow for durability and heat reduction when turning at an increased speed. In alternate embodiments, a material composition in the range from 0% to 100% of any other materials including steel, nickel, zinc, stainless steel, or aluminum, or any material known to those skilled in the art may be used to achieve the optimal or required torque input capacity.

Figure 3B:
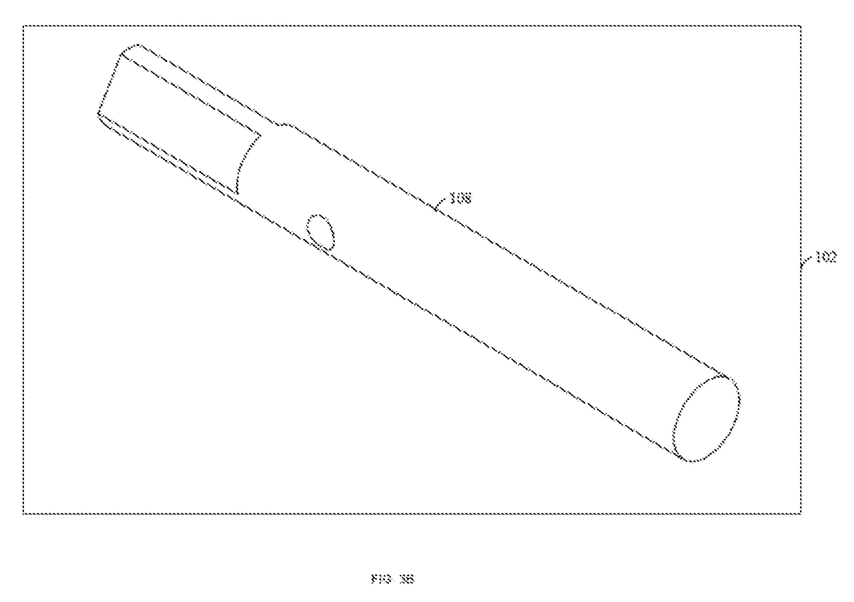
FIG. 3B is the pinion gear shaft inside the gearbox in accordance with an exemplary embodiment of the invention.

FIG. 3B illustrates the pinion gear shaft 108 inside the gearbox 102 in accordance with another exemplary embodiment of the invention. In still another embodiment, the pinion gear shaft 108 may intersect through the bevel pinion gear 106 and may act as an actuator for the gearbox 102. In other embodiments, a crank handle (not shown) or drill attachment (not shown) may be connected to a side of the pinion gear shaft 108. In some implementations, pinion gear shaft 108 may have a material composition mixture of 8%-12% copper, and/or 88%-91% iron. This material composition mixture is optimal to allow for durability and heat reduction when turning at an increased speed. In alternate embodiments, a material composition in the range from 0% to 100% of any other materials including steel, nickel, zinc, stainless steel, or aluminum, or any material known to those skilled in the art may be used to achieve the optimal or required torque input capacity.

Figure 3C:
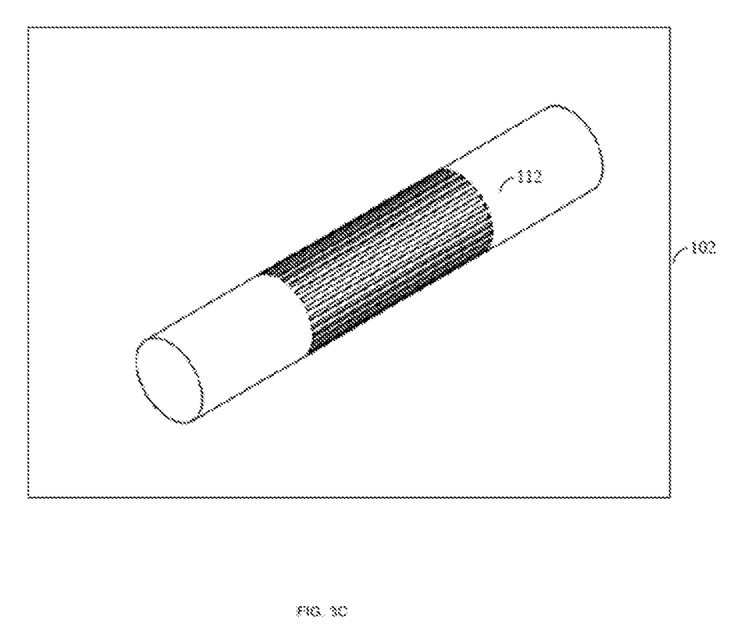
FIG. 3C is the pinion driver inside the gearbox in accordance with an exemplary embodiment of the invention.

FIG. 3C illustrates the pinion driver 112 inside the gearbox 102 in accordance with another exemplary embodiment of the invention. In yet another embodiment, the pinion driver 112 may connect the pinion gear shaft 108 to the bevel pinion gear 106. In some implementations, a hole may exist on the pinion gear shaft 108 where the pinion driver 112 may sit vertically through. In one embodiment, the bevel pinion gear 106 may slide through the pinion gear shaft 108. In another embodiment, a pocket may be located on the back of the bevel pinion gear 106 for the pinion driver 112 may sit thereon so that when the gear shaft 108 is rotated, the pinion driver 112 helps to rotate the pinion gear 110 (not shown). In some embodiments, the pinion driver 112 may have a material composition mixture of 8%-12% copper, and/or 88%-91% iron. This material composition mixture is optimal to allow for durability and heat reduction when turning at an increased speed. In alternate embodiments, a material composition in the range from 0% to 100% of any other materials including steel, nickel, zinc, stainless steel, or aluminum, or any material known to those skilled in the art may be used to achieve the optimal or required torque input capacity.

FIG. 3D illustrates the bevel gear 114 inside the gearbox 102 in accordance with another exemplary embodiment of the invention. In another embodiment, the bevel gear 114 may be configured to, adapted to, or designed to intersect with the bevel pinion gear 106 to engage one or more screws. In other embodiments, the bevel pinion gear 106 may be a 16 teeth bevel gear. The screws may be configured to, adapted to, or actuated to raise or lower the outer housing. In turn, the outer housing may lower or raise the tongue of the trailer tongue jack system 100. In some embodiments, the screws may be an acme lead screw or acme lead thread. In some implementations, the bevel gear 114 may have a material composition mixture of of 8%-12% copper, and/or 88%-91% iron. This material composition mixture is optimal to allow for durability and heat reduction when turning at an increased speed. In alternate embodiments, a material composition in the range from 0% to 100% of any other materials including steel, nickel, zinc, stainless steel, or aluminum, or any material known to those skilled in the art may be used to achieve the optimal or required torque input capacity.

In another implementation, the bevel gear 114 may be implemented as two or more right angle bevel gears. The right angle bevel gears may be configured to, adapted to, or designed to, have a performance of a 12:16 gear reduction ratio. This gear reduction ratio is optimal to allow for supporting a heavier trailer weight rating of 2000 lb or more cargo weight capacity. As a result, a 25% reduction on efficiency is achieved relative to a conventional trailer jack with a typical ratio of 1:1. This 25% reduction is used to achieve the optimal ratio to minimize torque output while still maintaining a decent speed when cranking manually. Additionally, the 25% reduction is also optimal ratio for a commercial drill with voltage rating of 18 volts (V) to 36 volts (V) to perform at peak efficiency to avoid or to mimimize a motor burnout.

In alternate embodiment, the right angle bevel gears may be configured to, adapted to, or designed to, have a performance of a 12:12 gear reduction ratio. This gear reduction ratio is optimal to allow for supporting for a lighter trailer weight rating of under 2000 lbs cargo weight capacity.

Figure 4:
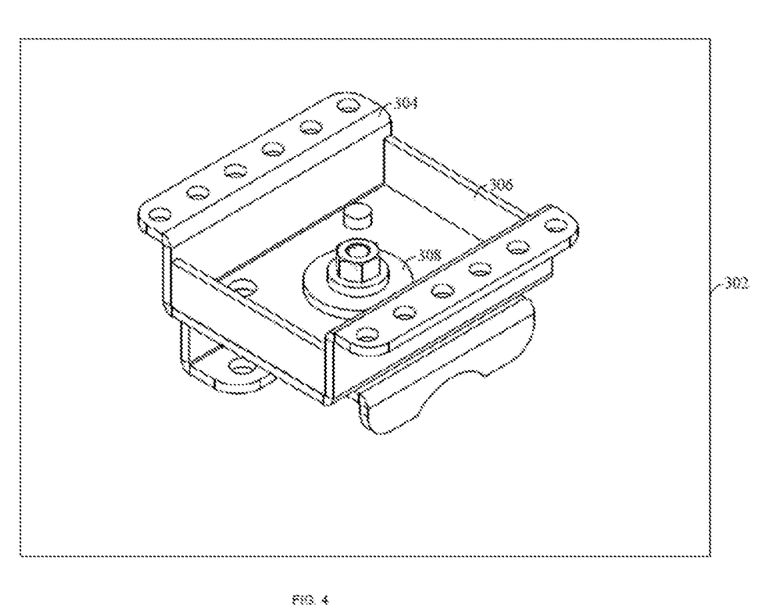
FIG. 4 is the mount of the trailer tongue jack system in accordance with an exemplary embodiment of the invention.
Figure 4A:
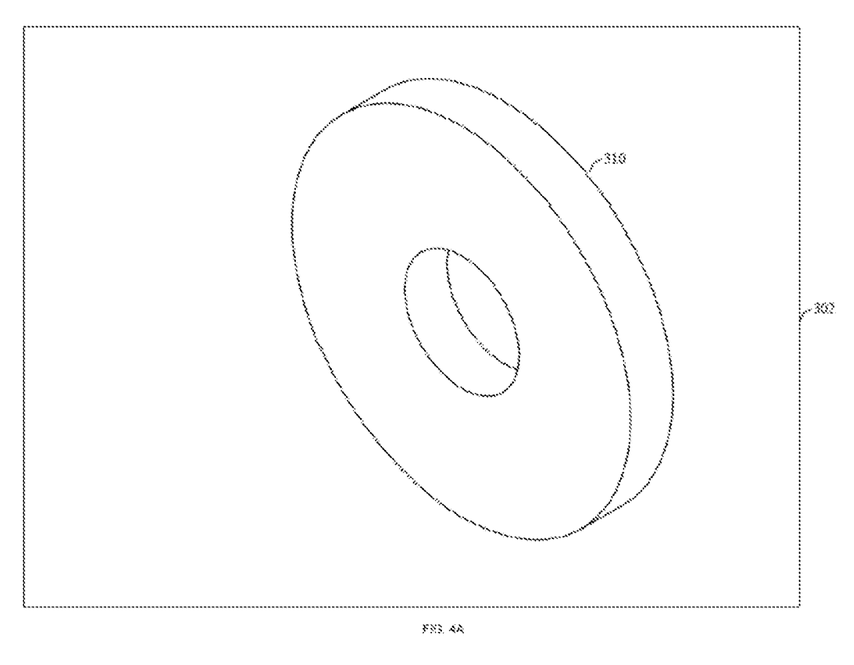
FIG. 4A is the mounting plate disk of the mount in accordance with an exemplary embodiment of the invention.

FIG. 4 illustrates the mount 302 in accordance with exemplary embodiments of the invention. As shown in FIG. 4, the mount 302 may include a mounting frame 304, frame side panels 306, a mounting frame disk 308, and a mounting plate disk 310 (not shown). FIG. 4A shows the mounting plate disk 310, which is positioned below the mounting frame 304. In some embodiments, the mount 302 may be implemented as an A-frame mount (not shown), a pipe mount (not shown), and a swivel mount (not shown) to mount a trailer to the trailer tongue jack system 100.

In still another embodiment, the mounting frame 304 may be attached or affixed to the side of a trailer. In some implementations, the mounting frame 304 may offer one or more holes for various trailer frame sizes. The frame side panels 306 may include brackets for mounting frame clamps onto to attach to the frames of a trailer. The mounting frame disk 308 and the mounting plate disk 310 may be sandwich between the mounting frame 304 and may act as washers to allow the frame of the trailer to rotate freely without scratching the surface. In alternate embodiments, the mounting frame 304 may be removably attached, slidably coupled, partially affixed, or completed affixed to the trailer. In some implementations, the mount 302 may have at least two surface coatings. In one surface coating, a materials surface coating of zinc and/or nickel may be applied to the mount 302. In another surface coating, a powder coating may be applied. This material surface coating and/or powder coating is optimal to allow for weather resistance to maintain longer performance of the mount 302.

In some implementations, the A-frame mount may be configured, or designed, to be a triangular plate that may be welded, or affixed, directly or indirectly, to the outer tube 204. In one embodiment, the triangular plate may include three or more screw holes on each side and may be configured to attach to a standard trailer coupler.

In yet another embodiment, the pipe mount may be configured to, adapted to, or designed to be a circular female 3-inch tube that rotates around a male tube of the same length. In an alternate embodiment, a 1-inch cotter pin may be inserted vertically through two circular tubes to lock, or securely fasten, the trailer tongue jack system 100 in a fixed position.

In still another embodiment, the swivel mount may be configured, or designed, to compactly fold up the trailer tongue jack system 100 for storage. In this embodiment, the swivel mount may be configured to use with a 4-Bolt mounting plate. The 4-Bolt mounting plate may be configured to provide extra side load support with a convenient ½", spring-loaded pull pin that may be configured to secure and release the trailer tongue jack system 100. In other embodiments, the swivel mount may be configured to include one or more plastic wheels to easily move a standard trailer. Further, this embodiment may include an inner tube that rotates with the one or more wheels to allow movement in any direction and a sidewind handle with a comfortable, grooved grip.

In some embodiments, the trailer tongue jack system 100 may be implemented as either manually operated form or power drill-operated form. In a power drill operated form, the trailer tongue jack system 100 may achieve up to 3 times faster speed than a manually operated trailer jack via a hand crank for a gear ratio of 12:16. Further, in a power drill operated form, the trailer tongue jack system 100 may achieve up to 2.3 times faster speed than a manually operated trailer jack via a hand crank for a gear ratio of 1:1.

Many different arrangements of the various components depicted, as well as components not shown, are possible without departing from the spirit and scope of the present invention. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

What is claimed is:

1. A trailer jack device comprising:
    a gearbox for actuating motion of a trailer;
    the gearbox comprising a shaft having a first end for interfacing with a power drill and a second end coupled to one or more gear elements within the gearbox;
    the first end of the shaft having an external surface having at least one flat surface for engagement with an inner rotational surface coupled to the power drill;
    a mount connected to the gearbox via a tube;
    wherein upon coupling of the power drill to the first end of the shaft, the power drill affects rotation of the shaft to drive the one or more gear elements of the gearbox and affects said motion of the trailer;
    wherein the mount has a mount surface for coupling the trailer to the gearbox; and
    wherein the gearbox is geared with a specified gear reduction ratio such that the power drill when driving rotation of the shaft operates at a specified reduction efficiency;
    wherein the gear reduction ratio corresponds to a 25% reduction on efficiency with respect to the power drill.

2. The device of claim 1, wherein the gear reduction ratio is 12:16.

3. The device of claim 1, wherein the one or more gear elements of the gearbox comprise a pair of mating right angle bevel gears coupled to the shaft.

4. The device of claim 1, wherein the one or more gear elements are tuned to provide a gear reduction ratio that corresponds to an optimal peak efficiency of a power drill.

5. The device of claim 1, wherein the mount consists of one of the following: a plated mount; a pipe mount; and a swivel mount.

6. The device of claim 1, wherein the external surface of the shaft comprises three flat surfaces disposed into a circumference of the shaft.

7. A method for actuating motion of a trailer, comprising:
mounting a gearbox to a trailer jack;
the gearbox comprising a shaft having a first end for interfacing with a power drill and a second end coupled to one or more gear elements within the gearbox;
engaging the first end of the shaft with the power drill, the shaft having an external surface configured to mate with a corresponding flat inner rotational surface coupled to the power;
operating the power drill to affect rotation of the shaft;
wherein rotation of the shaft drives the one or more gear elements of the gearbox; and
affecting motion of the trailer, wherein the gearbox is geared with a specified gear reduction ratio such that the power drill when driving rotation of the shaft operates at a specified reduction efficiency;
wherein the gear reduction ratio corresponds to a 25% reduction on efficiency on with respect to the power drill.

8. A trailer jack actuator, comprising:
a gearbox for actuating motion of a trailer;
the gearbox comprising a shaft having a first end for interfacing with a power drill and a second end coupled to one or more gear elements within the gearbox;
the first end of the shaft having an external surface having at least one flat surface for engagement with a inner rotational surface coupled to the power drill;
wherein upon coupling of the power drill to the first end of the shaft, the power drill affects rotation of the shaft to drive the one or more gear elements of the gearbox and affect said motion of the trailer; and
wherein the gearbox is geared with a specified gear reduction ratio such that the power drill when driving rotation of the shaft operates at a specified reduction efficiency;
wherein the gear reduction ratio corresponds to a 25% reduction on efficiency with respect to the power drill.

* * * * *